US012434493B2

(12) United States Patent
Tamura

(10) Patent No.: US 12,434,493 B2
(45) Date of Patent: Oct. 7, 2025

(54) PRINTER AND CUTTER UNIT

(71) Applicant: TOSHIBA TEC KABUSHIKI KAISHA, Tokyo (JP)

(72) Inventor: Toshiyuki Tamura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 170 days.

(21) Appl. No.: 18/461,548

(22) Filed: Sep. 6, 2023

(65) Prior Publication Data

US 2025/0074084 A1 Mar. 6, 2025

(51) Int. Cl.
*B41J 11/66* (2006.01)
*B41J 11/70* (2006.01)

(52) U.S. Cl.
CPC .................................... *B41J 11/70* (2013.01)

(58) Field of Classification Search
CPC ...... B41J 13/0036; B41J 13/106; B41J 11/66; B41J 11/70
See application file for complete search history.

(56) References Cited

U.S. PATENT DOCUMENTS

2021/0122593 A1* 4/2021 Nakamura ............. B65H 1/266

FOREIGN PATENT DOCUMENTS

JP 2002-104705 4/2002
JP 2002-274726 9/2002

* cited by examiner

*Primary Examiner* — Scott A Richmond
(74) *Attorney, Agent, or Firm* — Amin, Turocy & Watson, LLP

(57) ABSTRACT

According to one embodiment, a printer includes a printing unit that prints on a strip of sheet, and a cutter unit that cuts and discharges the sheet on the downstream side of the printing unit. The cutter unit includes an elastic film that is positioned below a sheet discharge port discharging the sheet, is provided to protrude downstream in the sheet discharge direction, and touches a lower surface of the sheet with its leading end portion to support the sheet.

7 Claims, 4 Drawing Sheets

PRINTER AND CUTTER UNIT

FIELD

Embodiments described herein relate generally to a printer and a cutter unit and a methods related thereto.

BACKGROUND

In the related art, there is a printer provided with a cutter unit. The cutter unit cuts and discharges a sheet printed by a printing unit. The cut sheet falls from a sheet discharge port due to its own weight and is stacked (piled) at a predetermined position.

As described above, in a printer that stacks sheets by the own weight, there are cases where a large number of tickets are dispensed in succession using, for example, fanfold paper. In such a case, it is desirable to stack the sheet in the same order as the printing order. However, for example, before the cut sheet falls from the edge of the sheet discharge port, the next discharged sheet may fall, or some other inconvenience may occur where the printing order and the stacking order may be inconsistent.

DETAILED DESCRIPTION

First Embodiment

Figure 1:
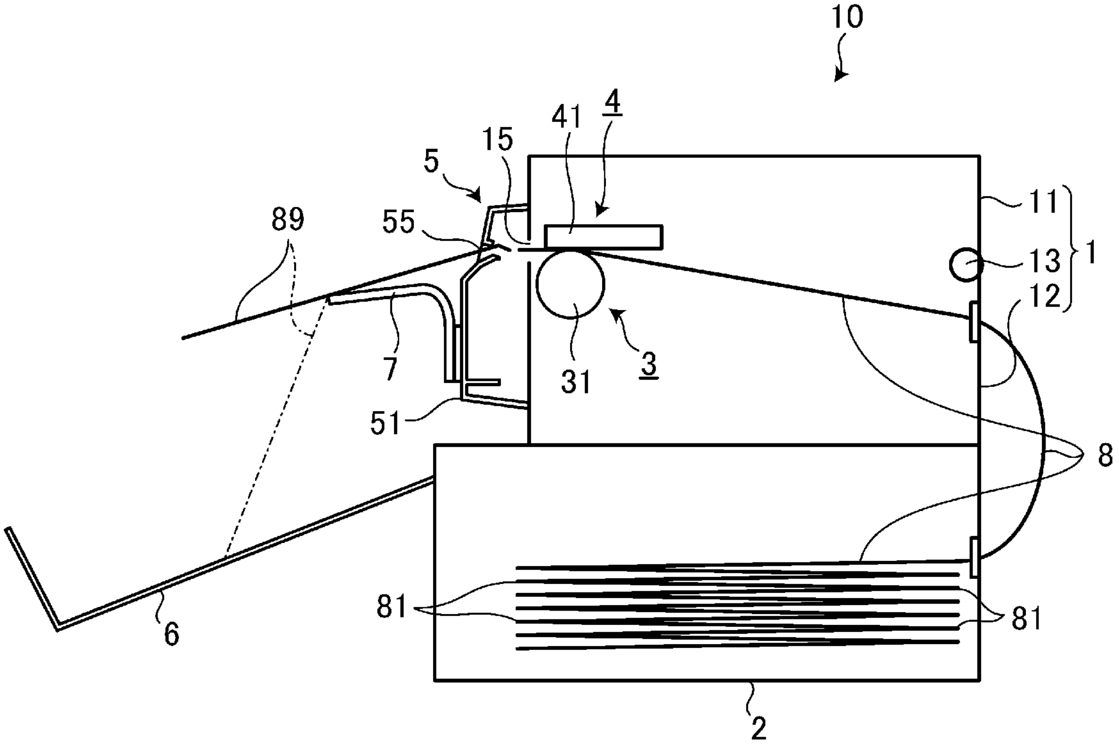
FIG. 1 is a schematic side view illustrating an example of the structure of a printer 10 according to the present embodiment.

Embodiments will be described with reference to the drawings. FIG. 1 is a schematic side view illustrating an example of the structure of a printer 10 according to the present embodiment. The printer 10 includes a housing 1, a sheet storage unit 2, a sheet conveyance unit 3, a printing unit 4, a cutter unit 5, a sheet discharge tray 6, and the like.

The housing 1 is a container that is divided into an upper case 11 and a lower case 12, and accommodates the sheet conveyance unit 3 and the printing unit 4. The upper case 11 and the lower case 12 are both boxes with one side open, and are rotatably connected with one side as a shaft 13. Thereby, the upper case 11 and the lower case 12 can move between a position where the mutual openings are aligned and a position where the mutual openings are opened.

Out of the edges of the openings of the upper case 11 and the lower case 12, the sides opposite to the shaft 13 are brought together to form a sheet discharge port 15. The sheet discharge port 15 is a slit-shaped opening through which the sheet 8 printed by the printing unit 4 is discharged. The sheet 8 discharged from the sheet discharge port 15 is supplied to the cutter unit 5.

Hereinafter, the side on which the sheet discharge port 15 is provided will be described as the front side of the printer 10. That is, the side on which the shaft 13 is provided (the hinge side between the upper case and the lower case) is the back side of the printer 10.

The housing 1 is placed on the sheet storage unit 2. The sheet storage unit 2 is provided under the housing 1 and stores the sheet 8 to be supplied to the housing 1. The sheet 8 is supplied from the back side of the sheet storage unit 2 to the back side of the housing 1. The sheet 8 is, for example, fanfold paper.

Figure 2:
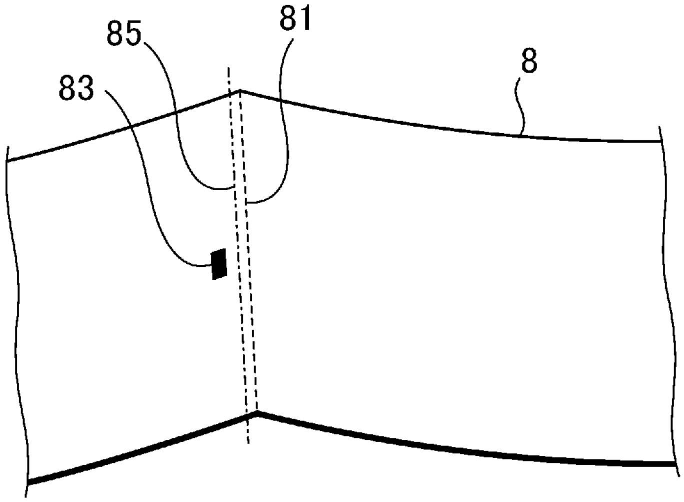
FIG. 2 is a diagram illustrating the appearance around a fold of a sheet 8, which is fanfold paper.

FIG. 2 is a diagram illustrating the appearance around a fold of a sheet 8, which is fanfold paper. Fanfold paper is a strip of paper that is folded in a zigzag pattern every predetermined length. A broken-line notch (also called perforation line or perforation) is made in a fold 81 of the sheet 8, which is fanfold paper. A mark 83 is printed near the fold 81. The single-dotted line in FIG. 2 illustrates an example of a cutting position 85.

The mark 83 is illustrated in a dark color such as black, and is detected by a sensor included in the printer 10. The printer 10 determines the position of the sheet 8 and the appropriate print position on the sheet 8 by detecting the mark 83 with the sensor.

The cutting position 85 is slightly (for example, about 1 mm) shifted from the fold 81. The cutter unit 5 of the printer 10 cuts the sheet 8, which is fanfold paper, at the cutting position 85 slightly shifted from the fold 81. The reason for not cutting at the fold 81 is to reduce the generation of chips. If the cut is made at the fold 81, the edge of the notch is cut thinly, or the like, and chips are generated each time the cut is made, resulting in a large amount of chips accumulating inside the cutter unit 5 and around the printer 10, which is not preferable.

Referring back to FIG. 1, the sheet 8 pulled out from the sheet storage unit 2 is supplied from the back side of the housing 1. The sheet conveyance unit 3 conveys the sheet 8 supplied to the housing 1 toward the front side.

The printing unit 4 prints on the sheet 8 and includes a print head 41 and a platen roller 31. The print head 41 is a thermal head and is biased by a bias member such as a spring in a direction to press against the outer peripheral surface of the platen roller 31. The sheet 8 is sandwiched between the print head 41 and the platen roller 31.

The sheet conveyance unit 3 includes the platen roller 31 and a motor that drives the platen roller 31 to rotate. The platen roller 31 conveys the sheet 8 sandwiched between the platen roller and the print head 41 by rotating under the driving force of the motor.

Figure 3:
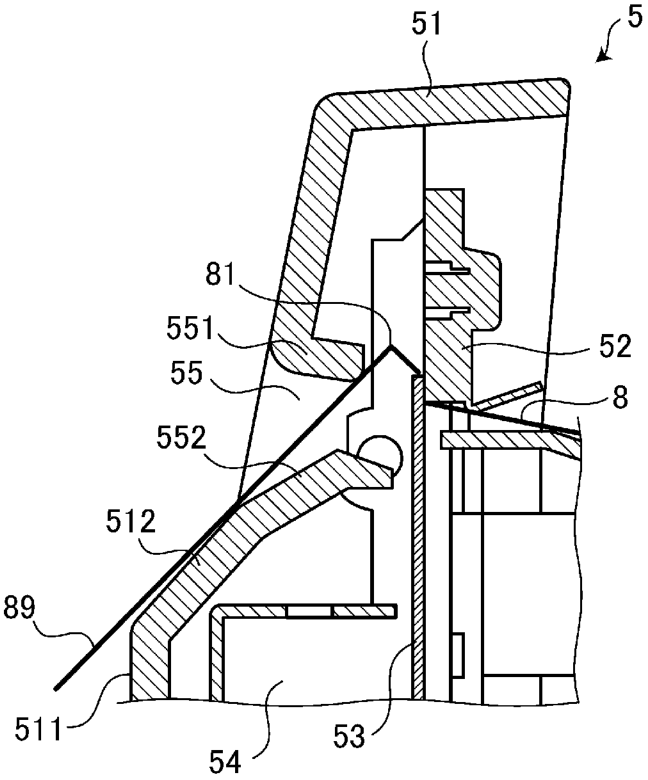
FIG. 3 is a vertical right-side view schematically illustrating an example of the structure of a cutter unit 5.
Figure 4:
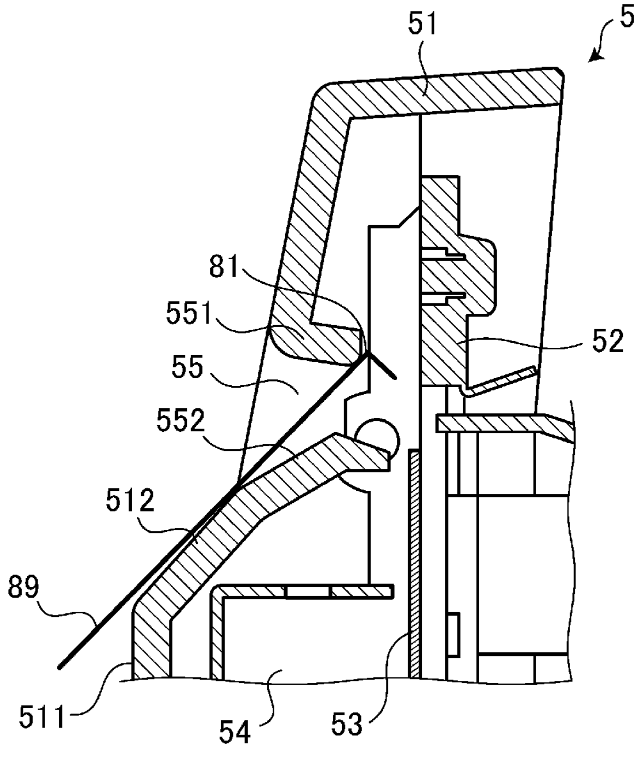
FIG. 4 is a vertical right-side view schematically illustrating an example of the structure of the cutter unit 5.

The cutter unit 5 is attached to the front of the housing 1. FIGS. 3 and 4 are vertical right side views schematically illustrating an example of the structure of the cutter unit 5. The cutter unit 5 includes a housing 51, a fixed blade 52, a movable blade 53, a drive unit 54, an elastic film 7, and the like. The housing 51 accommodates the fixed blade 52, the movable blade 53, the drive unit 54, and the like in a space between the housing 51 and the front surface of the housing 1. The housing 51 includes a sheet discharge port 55 on its front side.

The sheet discharge port 55 is an opening through which the cut sheet 89 is discharged, and is located in front of the sheet discharge port 15 (downstream side in the discharge direction). The sheet 89 discharged from the sheet discharge port 55 falls due to its own weight and is stacked (piled) on the sheet discharge tray 6 (see FIG. 1). The sheet discharge tray 6 is provided on the front side of the sheet storage unit 2. The sheet discharge tray 6 receives the sheet 89 cut by the cutter unit 5 and dropped by its own weight. The sheets 89 are piled (stacked) on the sheet discharge tray 6.

FIG. 3 illustrates the state where the sheet 8 was cut, and FIG. 4 illustrates the state where the movable blade 53 illustrated in FIG. 3 finished cutting and descended. The cutter unit 5 of the present embodiment cuts the sheet 8 slightly upstream of the fold 81. As a result, the cut sheet 89 has the fold 81 at the rear end portion.

The fixed blade 52 is fixedly provided at a predetermined position in the housing 51 with the cutting edge facing downward. The movable blade 53 is provided to be vertically movable under the fixed blade 52 with the cutting edge facing upward. Although the specific configuration and shape are not illustrated, the drive unit 54 is configured to include a motor, a link, and the like, and arranged on the front side of the movable blade 53 to move the movable blade 53 up and down.

As the movable blade 53 moves up and down, the cutting edge of the movable blade 53 slides with respect to the cutting edge of the fixed blade 52. During this sliding, the intersection of the cutting edge of the movable blade 53 and the cutting edge of the fixed blade 52 moves along the longitudinal direction of the mutual cutting edges. Thereby, the sheet 8 is cut.

It is desirable that the cutting position by the cutter unit 5, that is, the position where the movable blade 53 contacts the fixed blade 52 is closer to the printing unit 4. The reason for this is that if the cutting position by the cutter unit 5 is distant from the printing unit 4, it is often necessary to back feed the sheet 8 in order to align the print position of the sheet 8 after cutting. If the distance and the number of times of back-feeding are increased, the time required for print dispensing will increase, which is not preferable.

As described above, if the cutting position by the cutter unit 5 and the fixed blade 52 and the movable blade 53 are arranged close to each other, the drive unit 54 is arranged not on the back side but on the front side of the fixed blade 52 and the movable blade 53, that is, between the fixed blade 52 and the movable blade 53, and the housing 51, and is accommodated in the lower portion of the housing 51. Therefore, the lower portion (more specifically, the portion below the sheet discharge port 55) 511 of the housing 51 has a shape that protrudes toward the front side. As a result, the area below the lower edge 552 of the sheet discharge port 55 is no longer a vertical plane, and the area between the lower edge 552 and the lower portion 511 of the housing forms a slope 512 that gently connects the lower edge 552 and the lower portion 511 of the housing. The slope 512 is positioned below the sheet discharge port 55, protrudes (projects) toward the downstream side in the discharge direction of the sheet 8, and falls (descends) toward the downstream side in the discharge direction of the sheet 8.

The slope 512 is shaped so that the cut sheet 89 is less likely to get caught and the discharge and fall of the sheet 89 are not hindered as much as possible. However, the sheet 89 may be held in the state illustrated in FIG. 4 by being held by the upper edge 551 of the sheet discharge port 55 or the slope 512 and may not drop. The causes include the charging state of the housing 51 and the sheet 89, the degree of frictional force acting therebetween, the degree of flexibility of the sheet 8, as well as the location of the fold 81 (especially in the mountain fold state) at the rear end portion of the sheet 89.

Figure 5:
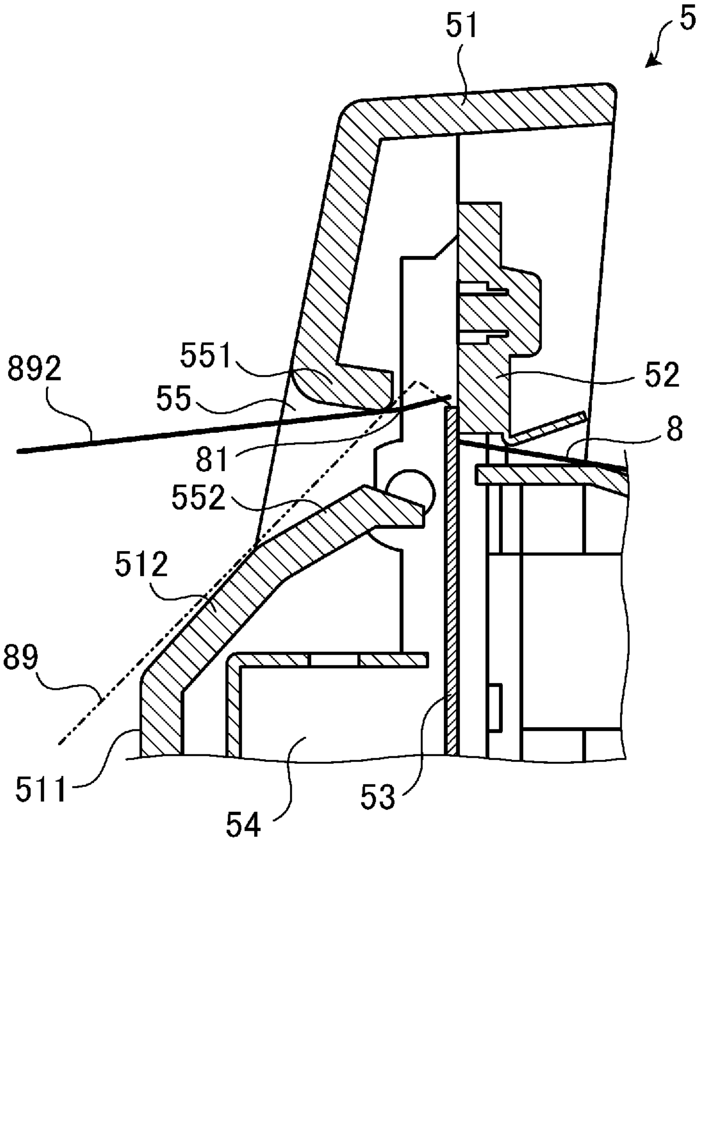
FIG. 5 is a diagram illustrating the inconvenience if a sheet 89 does not fall.

FIG. 5 is a diagram illustrating the inconvenience if the sheet 89 does not fall. Here, the state in which the sheet 89 remains in the sheet discharge port 55 is indicated by a chain double-dashed line. If the next sheet 892 is discharged while the sheet 89 remains in this way, the next sheet 892 gets under the previous sheet 89 and drops to the sheet discharge tray 6 together. In this case, the printing order and the stacking order do not match.

If the number of sheets to be continuously printed and dispensed is a few sheets, the operator may be able to notice the discrepancy in the order, but if a large number of sheets are dispensed in succession, it is difficult to manually check, making it difficult to notice the discrepancy. Therefore, if the printing order and the stacking order do not match, for example, if the sheets 89 and 892 are tickets or the like, there is a risk that the delivery destination will be mistaken. In order to avoid such an inconvenience, the cutter unit 5 of the present embodiment is provided with the elastic film 7 so that the printing order and the stacking order are matched.

Figure 6:
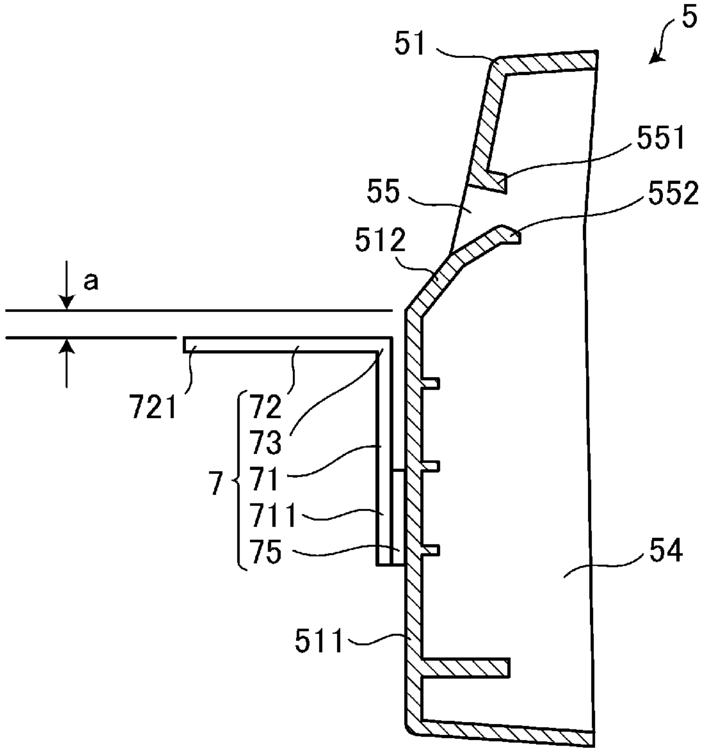
FIG. 6 is a diagram illustrating the attachment state of an elastic film 7.

FIG. 6 is a diagram illustrating the attachment state of the elastic film 7. The elastic film 7 includes a first section 71, a second section 72, a bent portion 73, and a fixing portion 75.

The first section 71 is a portion fixed to the lower portion 511 of the housing 51. The second section 72 is a portion that protrudes forward from the housing 51 (downstream side in the discharge direction of the sheet 89). The bent portion 73 is a bent portion of the elastic film 7 and is a portion that is located between the first section 71 and the second section 72 and makes the first section 71 and the second section 72 continuous at a predetermined angle (for example, about 90°). The fixing portion 75 fixes the lower portion 711 of the first section 71 to the housing 51, and is, for example, an adhesive tape or an adhesive.

The first section 71 is attached to the front surface of the housing 51 with its thickness direction substantially facing the front-rear direction of the printer 10. Thereby, the second section 72 protrudes from the front surface of the housing 51 substantially along the front-rear direction of the printer 10. The first section 71 is an example of the base portion.

Here, the height difference a between the bent portion 73 and the lower end portion of the slope 512 is a positive number. In other words, the bent portion 73 is positioned slightly lower than the lower end portion of the slope 512 and not above the lower end portion of the slope 512.

An imaginary line connecting the leading end portion 721 of the elastic film 7 and the lower edge 552 of the sheet discharge port 55 does not touch the slope 512 and is positioned away from the slope 512. This makes it difficult for the sheet 89 to come into surface contact with the slope 512.

The elastic film 7 is a flexible thin plate made of resin, for example. The elastic film 7 may be made of other materials and, for example, can be made of metal. The metal elastic film 7 is superior in durability to the resin film, but the resin film is superior in terms of safety and cost.

Figure 7:
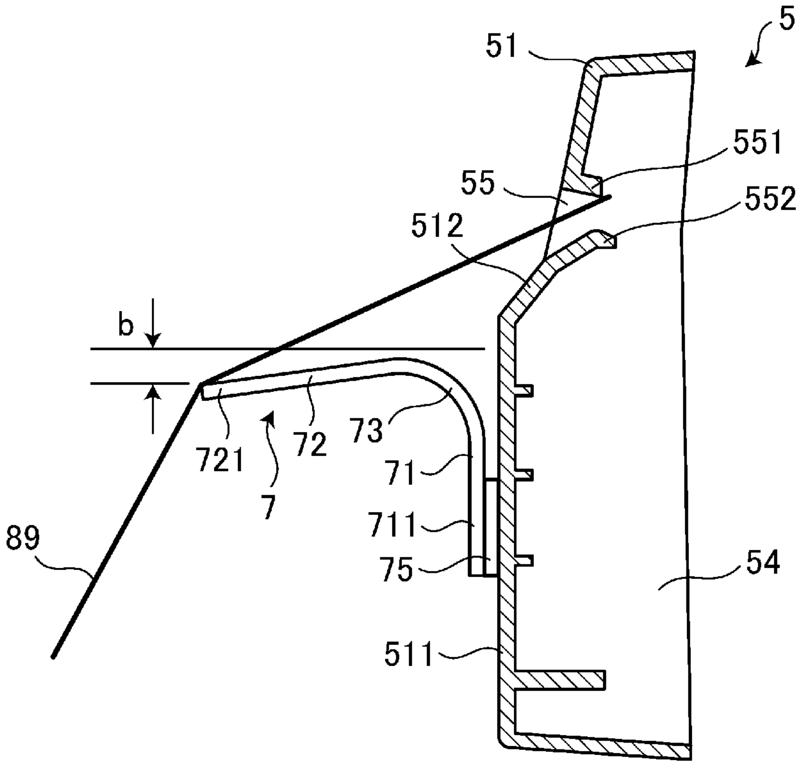
FIG. 7 is a diagram illustrating the elastic film 7 bent by the load of the sheet 89.

FIG. 7 is a diagram illustrating the elastic film 7 bent due to the load of the sheet 89. Since the sheet 89 before being cut is continuous with the succeeding sheet 8, the rear end portion is supported and rests on (touches) the leading end portion 721 of the elastic film 7. At this time, the elastic film 7 bends by a bending amount b corresponding to the downward load received from the sheet 89. In this state, the sheet 89 and the elastic film 7 are in line contact, not in surface contact, and the contact area between the two is small, so that static electricity is less likely to affect the sheet 89 and the elastic film 7.

If the sheet 89 is cut, the rear end portion thereof is no longer supported by the succeeding sheet 8, and the balance between the sheet 89 and the elastic film 7 is disturbed. As a result, the magnitude and direction of the load applied to the leading end portion 721 of the elastic film 7 are disturbed, and the elastic film 7 shakes (vibrates). If the elastic film 7 vibrates, the sheet 89 also vibrates. As a result, the sheet 89 can be shaken off from the sheet discharge port 55.

In the printer 10 configured as described above, the sheet 8 is pulled out from the sheet storage unit 2 and supplied from the back side of the housing 1, and is conveyed by the sheet conveyance unit 3 to reach the printing unit 4. After passing through the printing unit 4, the sheet 8 is discharged from the sheet discharge port 55. The portion of the sheet 8 protruding from the sheet discharge port 55 is supported while being in contact with the edge of the sheet discharge port 55 and the leading end portion 721 of the elastic film 7. At this time, the elastic film 7 receives a downward load from the sheet 8 and bends. After printing by the printing unit 4 is completed, the cutter unit 5 cuts the sheet 8. As the sheet 8 is cut, the load applied to the elastic film 7 is disturbed and the elastic film 7 vibrates. The cut sheet 89 vibrates due to the vibration of the elastic film 7 and is shaken off from the sheet discharge port 55. As a result, the sheet 89 does not stay at the edge of the sheet discharge port 55 and falls as it is cut, and piles up on the sheet discharge tray 6. As a result, the sheets 89 are stacked in the printing order. As a result, the printing order and the stacking order can be reliably matched.

Here, for reference, examples of various dimensions are described. First, the maximum width of the sheet 8 that can be printed by the printer 10 is 100 mm. Here, for example, if sheets 8 and 89 having a width of 60 to 70 mm are used, suitable dimensions of the elastic film 7 are, for example, a width of 40 mm, a length of the first section 71 of 30 mm, and a length of the second section 72 of 30 mm, and a length of the fixing portion 75 of 15 mm. In addition, the elastic film 7 is attached to the center portion in the width direction of the sheet discharge port 55. Moreover, the width dimension of the elastic film 7 is preferably half or more of the width of the sheet 8.

The inventor conducted an experiment on how easily the sheet 89 can be shaken off if the thickness of the elastic film 7 having the dimensions described above is 75 μm, 100 μm, 125 μm, 188 μm, and 250 μm. In this experiment, the effect of shaking off the sheet 89 was obtained in any case, and among the elastic films with respective thicknesses, the elastic film 7 with a thickness of 125 μm acted most preferably.

As the thickness of the elastic film 7 increases, the durability of the elastic film 7 increases. Experiments show that it becomes harder to obtain the desired amount of the bending amount b, resulting in less vibration to the sheet 89, which increases the ease of charging and makes the sheet 89 more likely to stick.

Furthermore, the inventor conducted experiments by fixing the thickness to 125 μm and changing the width of the elastic film 7. If widths of 20 mm, 30 mm, and 40 mm were compared, the sheet 89 was preferably shaken off in any case.

Also, an experiment was conducted in which the dimensions of the elastic film 7 were kept constant and the length of the fixing portion 75 was changed. If the fixing portion 75 having a length of 15 mm and the fixing portion 75 having a length of 30 mm were compared, the effect was obtained in both cases, and a better effect was obtained in the case of the fixing portion 75 with 15 mm. In this experiment, the case where the fixing portion 75 has a length of 30 mm is an example of a case in which the first section 71 is entirely fixed, and the case where the fixing portion 75 has a length of 15 mm is an example of a case in which a portion (more specifically, approximately half) of the first section 71 is fixed.

The above results are presumed to be due to the fact that the bending amount b is larger if the fixing portion 75 has a length of 15 mm than if it has a length of 30 mm. The larger the bending amount b, the larger vibration can be obtained if the sheet 89 is cut. However, if the dimensional relationship is such that the bending amount b becomes too large, surface contact between the sheet 89 and the elastic film 7 is likely to occur, and there is a concern about the effects of static electricity. It is also believed that the elastic film 7 is less likely to generate a force in the direction of return from its bent state. Therefore, it is preferable to use the elastic film 7 having the optimum thickness, length, and material for the actual dimension of the sheet 89 with reference to the above experimental results.

If the first section 71 is entirely fixed, the bending amount b is reduced, while the durability of the elastic film 7 is improved.

Moreover, regardless of the length of the fixing portion 75, the contact between the sheet 89 and the slope 512 is reduced by the elastic film 7, so that the sheet 89 can be made difficult to stay at the sheet discharge port 55 as compared with the case where the elastic film 7 is not provided.

According to the above embodiment, the printing order and the stacking order can be matched.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer comprising a printing component that prints on a strip of a sheet and a cutter component that cuts and discharges the sheet on a downstream side of the printing component, wherein the cutter component includes an elastic film positioned below a sheet discharge port for discharging the sheet, provided to protrude downstream in a sheet discharge direction, and to support the sheet by touching a lower surface of the sheet with a leading end portion thereof.

2. The printer according to claim 1, wherein the cutter component further includes:

a fixed blade having a downward cutting edge facing an upper surface of the sheet; and a movable blade having an upward cutting edge facing the lower surface of the sheet, the movable blade configured to move up and down to cut the sheet between the downward cutting edge of the fixed blade and the upward cutting edge of the movable blade.

3. The printer according to claim 1, wherein the elastic film includes:

a plate-shaped first section fixed under the sheet discharge port;

a plate-shaped second section that protrudes downstream in the sheet discharge direction from below the sheet discharge port; and a bent portion that connects the first section and the second section at a predetermined angle.

4. The printer according to claim 3, wherein the elastic film has flexibility, and a portion of the first section that is apart from the bent portion is fixed below the sheet discharge port.

5. The printer according to claim 3, wherein a bottom of the sheet discharge port has a downward slope that protrudes more downstream of the sheet discharge direction, and the bent portion is positioned below a lower end portion of the slope.

6. The printer according to claim 5, wherein an imaginary line connecting the leading end portion of the elastic film and a lower edge of the sheet discharge port is located away from the slope.

7. The printer according to claim 1, wherein a width dimension of the elastic film is half or more of a width dimension of the sheet.

* * * * *